(12) United States Patent
D'Orlando et al.

(10) Patent No.: US 10,919,637 B2
(45) Date of Patent: Feb. 16, 2021

(54) TEMPERATURE CONTROL SYSTEM FOR FUEL TANK INERTING SYSTEM

(71) Applicant: HAMILTON SUNDSTRAND CORPORATION, Windsor Locks, CT (US)

(72) Inventors: Paul M. D'Orlando, Simsbury, CT (US); Eric Surawski, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 909 days.

(21) Appl. No.: 15/208,139

(22) Filed: Jul. 12, 2016

(65) Prior Publication Data

US 2018/0016023 A1 Jan. 18, 2018

(51) Int. Cl.
- B01D 53/02 (2006.01)
- B64D 37/32 (2006.01)
- B01D 53/22 (2006.01)
- B64D 13/06 (2006.01)

(52) U.S. Cl.
CPC ............ B64D 37/32 (2013.01); B01D 53/22 (2013.01); B64D 2013/0603 (2013.01); B64D 2013/0659 (2013.01)

(58) Field of Classification Search
CPC ............ B01D 53/22; B64D 2013/0603; B64D 2013/0659; B64D 37/32
See application file for complete search history.

(56) References Cited

U.S. PATENT DOCUMENTS

| | | | |
|---|---|---|---|
| 4,262,495 A | 4/1981 | Gupta et al. | |
| 4,556,180 A * | 12/1985 | Manatt | B64D 37/32 244/135 R |
| 5,461,882 A | 10/1995 | Zywiak | |
| 6,883,335 B2 | 4/2005 | Axe et al. | |
| 7,172,156 B1 | 2/2007 | Jones | |
| 7,618,008 B2 | 11/2009 | Scherer et al. | |
| 8,500,878 B2 | 8/2013 | Cremers et al. | |
| 9,072,921 B2 | 7/2015 | Ribarov et al. | |
| 9,085,368 B2 | 7/2015 | Kelnhofer et al. | |
| 9,242,734 B2 | 1/2016 | Gumm et al. | |
| 9,272,790 B2 | 3/2016 | Fukuda | |
| 9,669,936 B1 | 6/2017 | Fiterman et al. | |
| 2005/0224654 A1 | 10/2005 | Loss et al. | |
| 2005/0279208 A1 * | 12/2005 | Schwalm | B01D 53/22 96/4 |
| 2007/0023577 A1 | 2/2007 | Jones | |

(Continued)

FOREIGN PATENT DOCUMENTS

WO  2011005946 A1  1/2011

OTHER PUBLICATIONS

European Extended Search Report; Application No. 17180940.3; dated: Sep. 27, 2017; 10 pages.

(Continued)

Primary Examiner — Christopher P Jones
(74) Attorney, Agent, or Firm — Cantor Colburn LLP

(57) ABSTRACT

A fuel tank inerting system is provided including an air flow comprising air from a first source having a first temperature and air from a second source having a second temperature. The second temperature is cooler than the first temperature. At least one separating module is configured to separate an inert gas from the air flow.

9 Claims, 5 Drawing Sheets

(56) References Cited

U.S. PATENT DOCUMENTS

| | | | |
|---|---|---|---|
| 2008/0110603 A1 | 5/2008 | Fellague et al. | |
| 2010/0064886 A1* | 3/2010 | Surawski | B64D 37/32 95/17 |
| 2010/0155046 A1* | 6/2010 | Surawski | B64D 37/32 165/287 |
| 2010/0310392 A1 | 12/2010 | Lippold et al. | |
| 2011/0131999 A1 | 6/2011 | Gao | |
| 2013/0341465 A1 | 12/2013 | Massey et al. | |
| 2015/0000523 A1* | 1/2015 | Jojic | B01D 53/228 95/54 |
| 2015/0217153 A1* | 8/2015 | Jones | A62C 3/08 169/62 |
| 2015/0276331 A1* | 10/2015 | Delugan | F28F 9/02 165/177 |

OTHER PUBLICATIONS

European Office Action; Application No. 171809403-1010; dated: Jan. 10, 2020; 5 pages.
European Office Action; Application No. 171809403-1010; dated: Oct. 30, 2018; 5 pages.

* cited by examiner

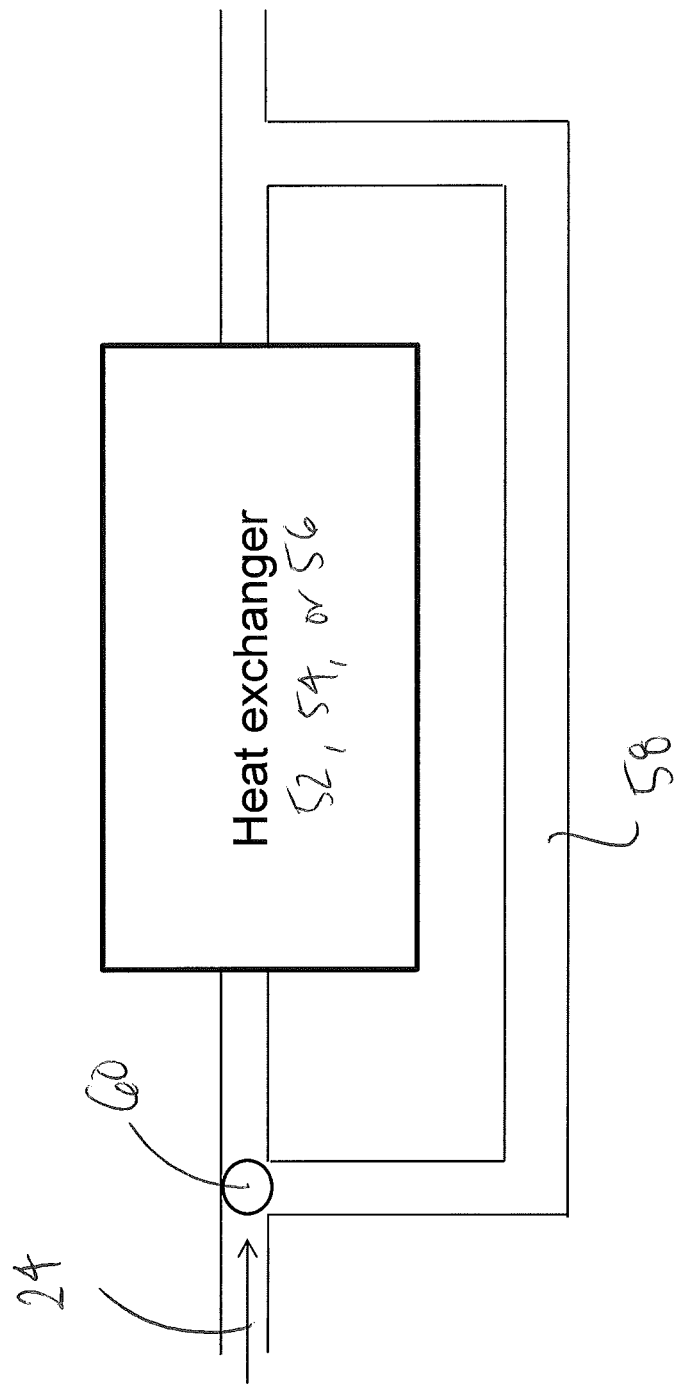

US 10,919,637 B2

TEMPERATURE CONTROL SYSTEM FOR FUEL TANK INERTING SYSTEM

BACKGROUND OF THE INVENTION

This invention generally relates to the aircraft on-board systems, and more particularly, to a temperature control system for on-board fuel tank inerting systems.

Fuel tank inerting systems are used to introduce an inert gas, such as nitrogen, into the fuel tanks of a vehicle, such as an aircraft. The inert gas displaces potentially dangerous fuel and air mixtures, thereby reducing the risk of explosion or fire. Typically, on board fuel inerting systems process air from an air source, such as bleed air taken from the engines of an aircraft. The bleed air is provided to a hollow fiber membrane where it is separated into nitrogen and oxygen. The separation efficiency of the membrane is directly dependent on the temperature of the air. However, there is a maximum allowable temperature of the bleed air to maintain the safety of the components downstream of the bleed air, such as filter, valves, and sensors, as well as safety relative to the fuel tank. Bleed air leaving the engines is extremely hot and therefore must be cooled before being processed. However, existing systems for cooling the bleed air to a safe temperature for inerting requires expensive processing equipment and negatively impacts the performance of the environmental control system of the aircraft.

BRIEF DESCRIPTION OF THE INVENTION

According to one embodiment, a fuel tank inerting system is provided including an air flow comprising air from a first source having a first temperature and air from a second source having a second temperature. The second temperature is cooler than the first temperature. At least one separating module is configured to separate an inert gas from the air flow.

According to an alternate embodiment of the invention, a fuel tank inerting system includes an air flow and at least one air separating module configured to separate an inert gas from the airflow. The air flow is cooled within a heat exchanger prior to being provided to the air separating module. A fluid arranged in a heat transfer relationship with the air flow within the heat exchanger is not RAM air.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a schematic diagram of a heat exchanger for cooling a temperature of the bleed air according to an embodiment.

DETAILED DESCRIPTION OF THE INVENTION

Figure 1:
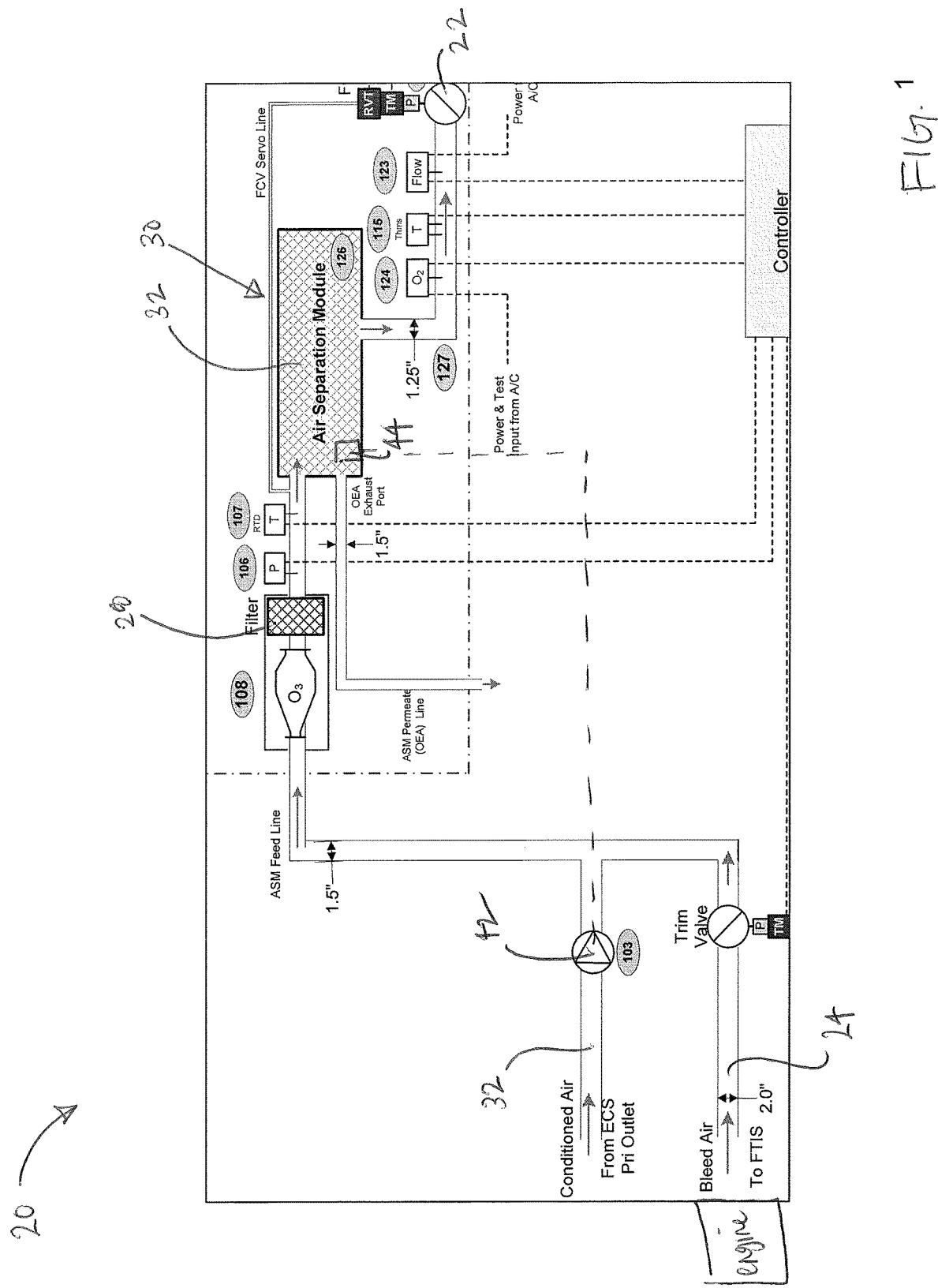
FIG. 1 is a schematic diagram of a fuel tank inerting system.

Referring now to FIG. 1, an example of a basic fuel tank inerting system (FTIS) 20 for controlling a supply of inerting gas to a fuel tank 22 is illustrated. The FTIS 20 uses an on-board supply of air 24 to generate the inerting gas. In the illustrated, non-limiting embodiment, the air 24 provided to the FTIS 20 is bled from one or more engines 26 of an aircraft. The bleed air 24 flows through a filter 28 before being provided to one or more air separation modules (ASM) 30. The ASMs 30 typically include a permeable membrane 32 having two sides. The oxygen rich bleed air passes across a first side of the membrane 32 and a secondary fluid flow passes over a second, opposite side of the membrane 32 to create a pressure differential across the membrane 32. The pressure differential causes oxygen to diffuse from the bleed air to the secondary fluid stream, and a magnitude of the pressure differential may therefore be used to control how much oxygen is diffused from the stream of bleed air. The secondary fluid flow may be provided from any suitable system having a low pressure airflow.

Figure 2:
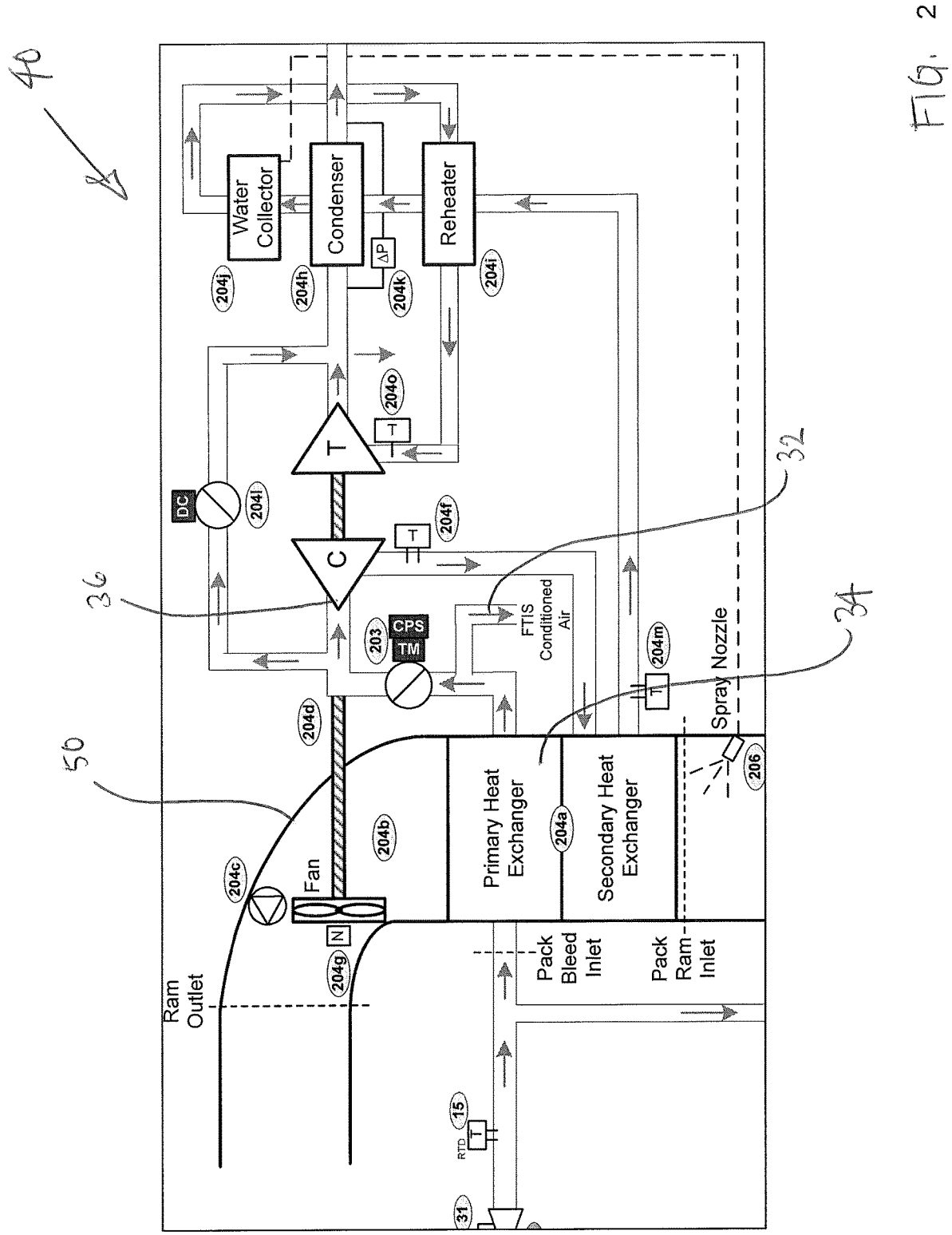
FIG. 2 is a schematic diagram of an environmental control system of an aircraft associated with a fuel tank inerting system according to an embodiment.
Figure 3:
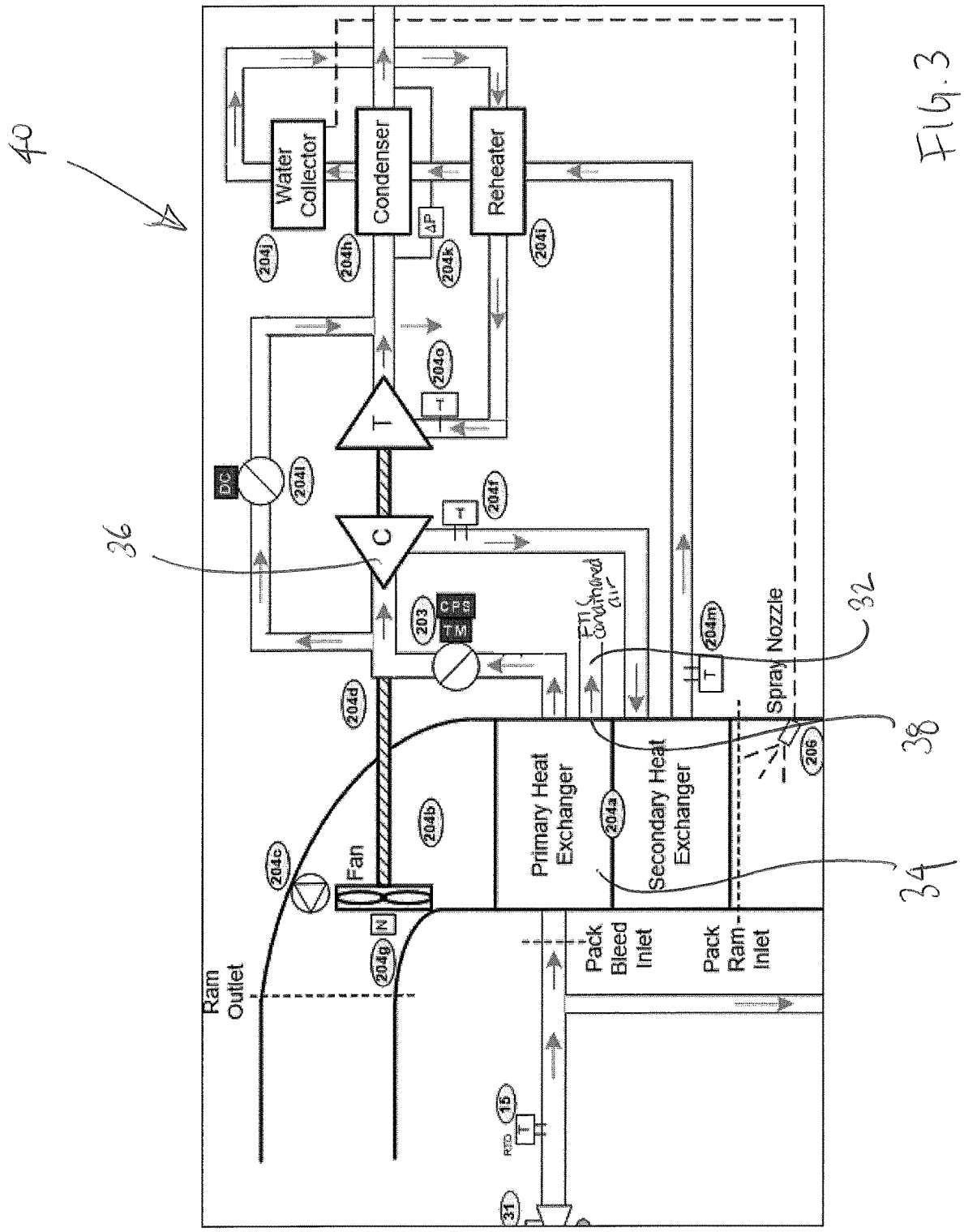
FIG. 3 is a schematic diagram of an environmental control system of an aircraft associated with a fuel tank inerting system according to another embodiment.

To maintain safety and a desired level of efficiency of the membrane 32 of the ASM 30 by controlling the temperature thereof, the bleed air 24 provided to the FTIS 20 is partially cooled prior to passing through the ASM 30. In an embodiment the air provided to the membrane 30 is between about 150° F. and about 250° F., and more specifically between about 150° F. and about 215° F. As shown in FIG. 1, the bleed air 24 may be mixed with a supply of cool air 32 to achieve a desired temperature. The cool air 32 to be mixed with the bleed air 24 in the FTIS 20 may be provided from any suitable cool air source. In the illustrated, non-limiting embodiment of FIG. 2, the cool air 32 is provided from the primary heat exchanger 34 of an environmental control system (ECS) 40 of an aircraft. However, other cool fluid sources within an ECS 40 are within the scope of the disclosure. For example, as shown, a portion of the cool air 32 output from the primary heat exchanger 34 and upstream from an air cycle machine 36 may be diverted to the FTIS 20. Alternatively, the primary heat exchanger 34 may be configured with two distinct flow paths, as shown in FIG. 3, arranged in a heat transfer relationship with a RAM air source. In such embodiments, the primary heat exchanger 34 may include one or more additional headers such that one or more passes within the heat exchanger 34 is coupled to an outlet 38 associated with and dedicated to the FTIS 20.

A flow control valve 42, best shown in FIG. 1, may be positioned within the conduit providing the cool air 32 to the FTIS 20. The valve 42 is operable to control the amount of cool air 32 supplied to the FTIS 20 and mixed with the bleed air 24. In an embodiment, the valve 42 is operated in response to a temperature of the air upstream of or within the ASM 30, as measured by a sensor, illustrated schematically at 44. If the sensed temperature is below a desired operating temperature, a controller or actuator (not shown) associated with the valve 42 and the sensor 44 will partially or fully close the valve 42 to limit or completely block the flow of cool air 32 to the FTIS 20. As a result, the temperature of the mixture of cool air 32 and bleed air 24 will increase. If the sensed temperature is greater than a maximum operating temperature, the controller or actuator will increase the ratio of cool air 32 to bleed air 24 provided to the FTIS 20 to reduce the temperature of the mixture of cool air 32 and bleed air 24. In an embodiment, the controller associated with the valve 42 may be a controller configured to control at least a portion of the ECS 40.

Figure 4:
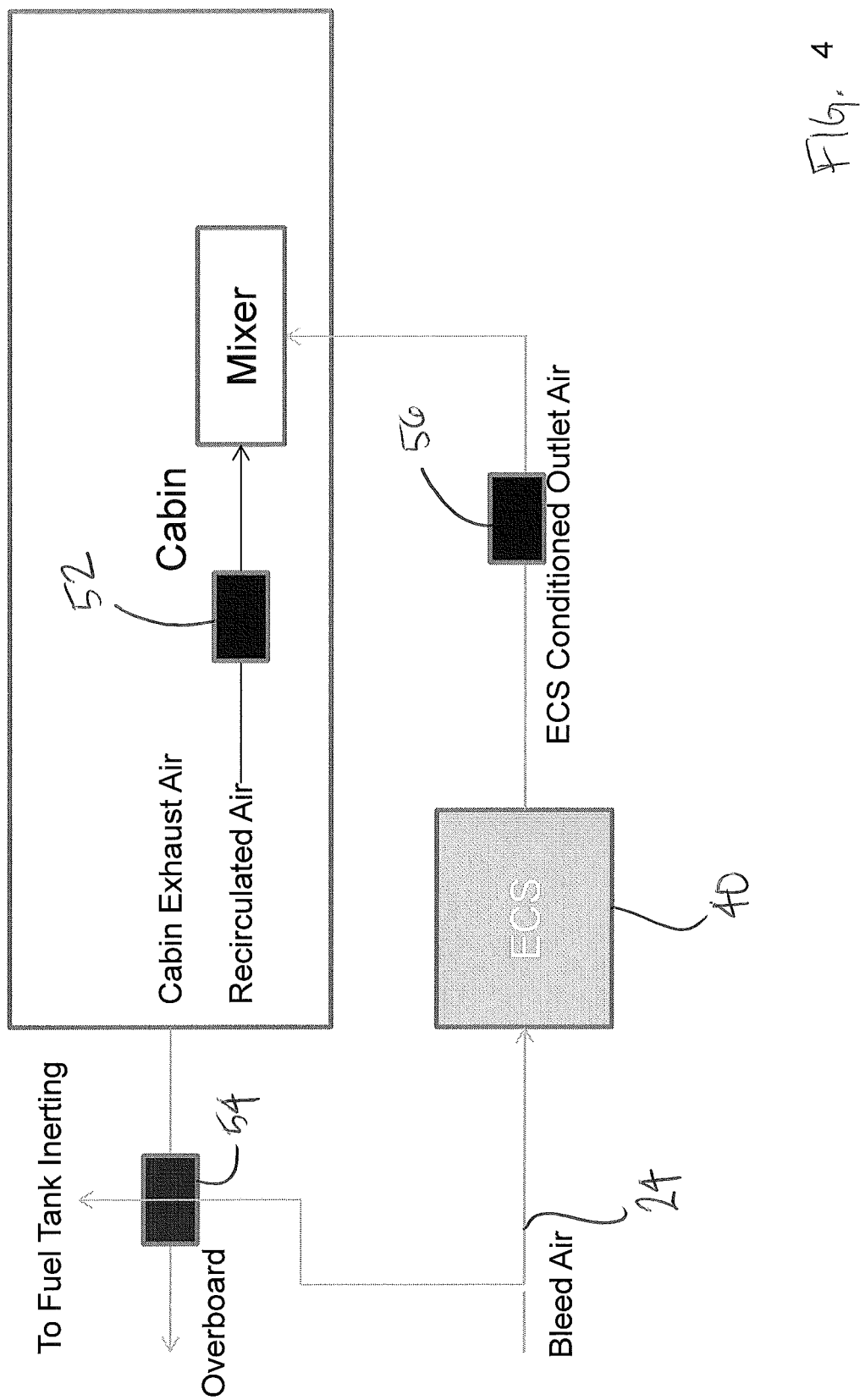
FIG. 4 is a schematic diagram illustrating various air flow paths within an aircraft compatible for use with a fuel tank inerting system according to an embodiment.

Alternatively, the bleed air 24 provided to the FTIS 20 may be partially cooled prior to passing through the ASM 30 through a heat transfer operation with a cool fluid source. In an embodiment, the bleed air 24 is cooled through a heat exchanger where the cool fluid source is located outside of a RAM circuit 50 (see FIGS. 2 and 3) of the ECS 40. With reference to FIG. 4, examples of suitable sources that may be used to cool the bleed air 24 within a heat exchanger include, but are not limited to, cabin recirculation air, as illustrated schematically by a heat exchanger located at 52, cabin exhaust air as illustrated schematically by a heat exchanger located at 54, and conditioned ECS outlet air as illustrated schematically by a heat exchanger located at 56. It should be further understood that although a single heat exchanger for cooling the bleed air 24 is illustrated and described herein, embodiments where a plurality of heat exchangers configured to provide multiple stages of cooling to achieve a desired temperature are also within the scope of the disclosure.

In embodiments where the bleed air 24 is cooled via one or more heat exchangers, such as heat exchanger 52, 54, or 56 for example, located outside of the RAM air circuit, a bypass conduit 58 may extend from upstream of the heat exchanger, as shown in FIG. 5. A valve 60, such as a three way valve for example, may be arranged at the upstream end or within the bypass conduit 58 to direct the flow of the bleed air 24 between the heat exchanger and the bypass conduit 58. As previously described, the valve 60 may be operated in response to a sensed temperature of the bleed air upstream of or within the ASM 30. If the sensed temperature is below a desired operating temperature, the valve may be operated to divert at least a portion of the bleed air 24 through the bypass conduit 58 to increase the temperature of the bleed air 24 provided to the FTIS 20. If the sensed temperature is greater than a maximum allowable operating temperature, the position of the valve is adjusted to reduce the amount of flow through the bypass conduit 58 and increase the flow of bleed air 24 that passes through the heat exchanger to reduce the temperature of the bleed air 24 provided to the FTIS 20.

Although mixing a cool air 32 with the bleed air 24 and including a heat exchanger to cool the bleed air 24 are illustrated and described separately, embodiments including both a cool air source 32 to be mixed with the bleed air 24 and a heat exchanger, such as heat exchangers 52, 54, and 56 for example, to cool the bleed air 24 are contemplated herein. In an embodiment, the bleed air 24 may be partially cooled in one or more heat exchangers before being mixed with a separate supply of cool air 32 and then supplied to an ASM 30. Alternatively, the bleed air 24 may be mixed with a supply of cool air 32, and then the mixture may be further cooled via a heat exchanger prior to being supplied to the ASM 30 of the FTIS 20.

The FTIS 20 described herein is configured to operate at a temperature to optimize efficiency of the ASM membrane 32 while maintaining a desired level of safety with at the fuel tank 22. The cooling air sources disclosed may be used to achieve the desired temperature with minimal impact to the ECS 40 of an aircraft 20. Accordingly, the FTIS 20 may be used in both new and retrofit applications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel tank inerting system for an aircraft comprising:
   a first air source;
   a second air source, wherein the second source includes air provided from an outlet of a primary heat exchanger of an environmental control system;
   an air flow including a mixture of air from the first air source having a first temperature and air from the second air source, distinct from the first air source, having a second temperature, the second temperature being cooler than the first temperature; and
   at least one air separating module configured to separate an inert gas from the air flow.

2. The fuel tank inerting system according to claim 1, wherein a ratio of air from the first air source and air from the second air source is controlled to achieve a desired temperature of the air flow as it passes through the at least one air separating module.

3. The fuel tank inerting system according to claim 2, wherein the desired temperature of the air flow is between about 150° F. and about 250° F.

4. The fuel tank inerting system according to claim 1, further comprising a sensor associated with the air separating module and a valve configured to control a volume of air from the second air source provided to the mixture.

5. The fuel tank inerting system according to claim 4, wherein if a temperature sensed by the sensor is below a desired threshold, the valve is operated to reduce the volume of air from the second air source within the mixture.

6. The fuel tank inerting system according to claim 4, wherein if a temperature sensed by the sensor is above a desired threshold, the valve is operated to increase the volume of air from the second air source within the mixture.

7. The fuel tank inerting system according to claim 4, wherein a controller is operably coupled to the valve, the controller also being configured to control at least a portion of an environmental control system of an aircraft.

8. The fuel tank inerting system according to claim 1, wherein the primary heat exchanger includes two or more flow paths therein and at one of the flow paths is dedicated as the second air source.

9. The fuel tank inerting system according to claim 1, wherein a portion of the air flow is cooled within a heat exchanger prior to being provided to the air separation module.

* * * * *